United States Patent
Kwon et al.

(10) Patent No.: US 12,113,238 B2
(45) Date of Patent: Oct. 8, 2024

(54) SEPARATOR FOR LITHIUM SECONDARY BATTERY, METHOD OF PRODUCING THE SAME, AND ELECTROCHEMICAL DEVICE INCLUDING THE SAME

(71) Applicants: SK Innovation Co., Ltd., Seoul (KR); SK ie technology Co., Ltd., Seoul (KR)

(72) Inventors: Tae Wook Kwon, Daejeon (KR); Heung Taek Bae, Daejeon (KR); Dong Yeon Lee, Daejeon (KR); Yun Bong Kim, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 126 days.

(21) Appl. No.: 17/463,907

(22) Filed: Sep. 1, 2021

(65) Prior Publication Data

US 2022/0077543 A1 Mar. 10, 2022

(30) Foreign Application Priority Data

Sep. 10, 2020 (KR) ........................ 10-2020-0115857

(51) Int. Cl.
| | |
|---|---|
| *H01M 50/446* | (2021.01) |
| *H01M 10/052* | (2010.01) |
| *H01M 50/403* | (2021.01) |
| *H01M 50/42* | (2021.01) |
| *H01M 50/449* | (2021.01) |
| *H01M 50/489* | (2021.01) |

(52) U.S. Cl.
CPC ....... *H01M 50/446* (2021.01); *H01M 10/052* (2013.01); *H01M 50/403* (2021.01); *H01M 50/42* (2021.01); *H01M 50/449* (2021.01); *H01M 50/489* (2021.01)

(58) Field of Classification Search
CPC ............. H01M 50/446; H01M 50/489; H01M 50/403; H01M 50/449; H01M 50/42; H01M 10/052
See application file for complete search history.

(56) References Cited

U.S. PATENT DOCUMENTS

| 11,011,754 B2 | 5/2021 | Asano | |
|---|---|---|---|
| 2018/0342711 A1* | 11/2018 | Asai | H01M 4/13 |
| 2019/0115577 A1 | 4/2019 | Kim et al. | |
| 2019/0305279 A1* | 10/2019 | Takamatsu | H01M 50/46 |
| 2020/0152985 A1* | 5/2020 | Yamamoto | H01M 50/449 |
| 2020/0335827 A1* | 10/2020 | Sugimoto | C09J 125/14 |
| 2020/0411870 A1* | 12/2020 | Adachi | C08F 220/56 |
| 2021/0218009 A1* | 7/2021 | Onishi | H01M 50/443 |
| 2021/0296732 A1* | 9/2021 | Koga | H01M 4/13 |
| 2022/0037741 A1* | 2/2022 | Lee | H01M 50/42 |

FOREIGN PATENT DOCUMENTS

| CN | 106519872 A | | 3/2017 | |
|---|---|---|---|---|
| JP | 2002246028 A | | 8/2002 | |
| JP | 2005190747 A | | 7/2005 | |
| KR | 20160033692 A | * | 3/2016 | |
| KR | 1020160033692 A | | 3/2016 | |
| KR | 1020180062416 A | | 6/2018 | |
| KR | 1020190002446 A | | 1/2019 | |
| KR | 2020039570 A | * | 4/2020 | ......... H01M 10/052 |
| KR | 20200039570 A | * | 4/2020 | |
| KR | 2020078011 A | * | 7/2020 | ............ C08F 220/56 |
| KR | 20200078011 A | * | 7/2020 | |

* cited by examiner

Primary Examiner — Christopher P Domone
Assistant Examiner — Jonathan William Estes
(74) Attorney, Agent, or Firm — The Webb Law Firm

(57) ABSTRACT

Provided is a separator for a lithium secondary battery including a porous substrate and a coating layer including a binder and inorganic particles formed on one surface or both surfaces of the porous substrate. The binder is a binder including: (a) a (meth)acrylamide-based monomer polymerization unit, (b) a (meth)acryl-based monomer polymerization unit containing a hydroxyl group, and (c) a polyfunctional (meth)acrylamide-based monomer polymerization unit. The separator according to the present invention provides a separator for a lithium secondary battery having improved adhesive strength between the inorganic particles and the separator, showing a decreased interfacial resistance characteristic, and showing an improved air permeability.

10 Claims, No Drawings

SEPARATOR FOR LITHIUM SECONDARY BATTERY, METHOD OF PRODUCING THE SAME, AND ELECTROCHEMICAL DEVICE INCLUDING THE SAME

CROSS-REFERENCE TO RELATED APPLICATION

This application claims priority to Korean Patent Application No. 10-2020-0115857 filed Sep. 10, 2020, the disclosure of which is hereby incorporated by reference in its entirety.

BACKGROUND OF THE INVENTION

Field of the Invention

The following disclosure relates to a separator for a lithium secondary battery, a method of producing the same, and a lithium secondary battery including the same. More particularly, the following disclosure relates to a separator including a coating layer including inorganic particles and a binder formed on a surface of a porous substrate and an electrochemical device including the same.

Description of Related Art

A battery includes a positive electrode, a negative electrode, a separator, and an electrolyte. Currently, most batteries are lithium secondary batteries, and since the lithium secondary battery has a long lifecycle of repeating charge and discharge and has excellent portability, it is used as a battery of portable electronic devices such as a smart phone.

In recent years, since performance of mobile devices and laptop PCs has been developed, the energy density of the lithium secondary battery is further increased, and thus, various safety problems arise.

In particular, a separator commonly used in a lithium secondary battery has a safety problem by internal short circuit resulted from shrinkage of a separator at a high temperature, due to its material characteristics and manufacturing process characteristics.

Securing safety in the production and use of the lithium secondary battery is an important problem to be solved. Recently, an organic-inorganic composite porous separator in which a slurry composition of inorganic particles and a binder polymer is coated on a porous substrate to form a porous inorganic coating layer, for securing safety of the lithium secondary battery, has been suggested. However, when an electrode assembly is formed by laminating an electrode and a separator, interlayer adhesive strength is not sufficient, so that there is a high risk of an inorganic substance and a separator being desorbed from each other, and in this process, the desorbed inorganic particles may act as a local defect in the device.

In order to solve the problem, Korean Patent Laid-Open Publication No. 10-2016-0033692 (Mar. 28, 2016) suggests a method of using a water-based slurry including a poly (meth)acrylamide dispersion with inorganic particles and organic particles on a porous polymer substrate to form a coating layer. It is suggested that the separator therefrom has thermal resistance with the porous substrate and excellent electrochemical properties, but the separator has yet to satisfy a problem of lowered porosity of the separator and a shrinkage rate at a high temperature which is a relatively greatly deteriorated property, and lacks battery resistance and a degree of stability, and thus, an improvement task therefor is urgently needed.

As such, since a coating layer including a binder and inorganic particles formed on a surface of a porous polymer substrate may contribute to improvement of thermal stability of an electrochemical device, development of a separator to further improve thermal resistance of an electrochemical device is currently demanded.

SUMMARY OF THE INVENTION

An embodiment of the present invention is directed to providing a separator having excellent thermal resistance which may impart safety at a high temperature by reducing a shrinkage rate at a high temperature of an electrochemical device, and a method of producing the same. Another embodiment of the present invention is directed to providing a new separator which prevents a decrease in air permeability due to a binder and has a decreased electrical resistance.

Still another embodiment of the present invention is directed to providing a separator for a lithium secondary battery including a coating layer including inorganic particles and a binder, in which adhesive strength of the inorganic particles is improved to prevent desorption of the inorganic particles, a decreased surface resistance characteristic is shown, and an improved air permeability is shown.

In one general aspect, a separator for a lithium secondary battery includes: a porous substrate and a coating layer including a binder and inorganic particles formed on one surface or both surfaces of the porous substrate, wherein the binder is a binder including: (a) a (meth)acrylamide-based monomer polymerization unit, (b) a (meth)acryl-based monomer polymerization unit containing a hydroxyl group, and (c) a polyfunctional (meth)acrylamide-based monomer polymerization unit.

In the separator for a lithium secondary battery according to an exemplary embodiment of the present invention, the binder may be a binder prepared by including (a) 65 to 96 mol % of the (meth)acrylamide-based monomer, (b) 3 to 34 mol % of the (meth)acryl-based monomer containing a hydroxyl group, and (c) 0.001 to 1 mol % of the polyfunctional (meth)acrylamide-based monomer.

In the separator for a lithium secondary battery according to an exemplary embodiment of the present invention, (c) the polyfunctional (meth)acrylamide-based monomer polymerization unit may be produced by polymerizing a polyfunctional monomer represented by the following Chemical Formula 3:

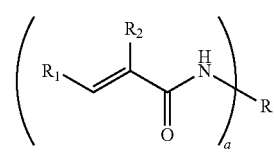

[Chemical Formula 3]

wherein $R_1$ and $R_2$ are independently of each other hydrogen or a C1 to C6 alkyl group, R is a linear or branched C1 to C10 hydrocarbon group, and a is an integer of 2 to 6.

In the separator for a lithium secondary battery according to an exemplary embodiment of the present invention, the binder may have a weight average molecular weight of 100,000 to 2,000,000 g/mol.

In the separator for a lithium secondary battery according to an exemplary embodiment of the present invention, the separator for a lithium secondary battery may include 50 to 99.9 wt % of the inorganic particles and 0.1 to 50 wt % of the binder in the total weight of the coating layer.

The separator for a lithium secondary battery according to an exemplary embodiment of the present invention may have a shrinkage rate at a high temperature of 5% or less in both a machine direction (MD) and a transverse direction (TD) after being allowed to stand at 150° C. for 60 minutes.

The separator for a lithium secondary battery according to an exemplary embodiment of the present invention may have a shrinkage rate at a high temperature of 3% or less in both the machine direction (MD) and the transverse direction (TD) after being allowed to stand at 150° C. for 60 minutes.

The separator for a lithium secondary battery according to an exemplary embodiment of the present invention may have a change amount of air permeability ($\Delta G$) satisfying the following Equation 1:

$$\Delta G = G1 - G2 \leq 70 \quad \text{[Equation 1]}$$

wherein G1 is a Gurley permeability of a separator including the coating layer, G2 is a Gurley permeability of the porous substrate itself, and the Gurley permeability is measured in accordance with ASTM D726 and has a unit of sec/100 cc.

In the separator for a lithium secondary battery according to an exemplary embodiment of the present invention, the coating layer may have a thickness of 0.3 to 10 µm.

In another general aspect, a lithium secondary battery includes the separator for a lithium secondary battery described above.

In still another general aspect, a method of producing a separator for a lithium secondary battery includes: (s1) preparing a slurry composition including a binder and inorganic particles; and (s2) applying the slurry composition on one surface or both surfaces of a porous substrate to form a coating layer, wherein the binder includes a binder including: (a) a (meth)acrylamide-based monomer polymerization unit, (b) a (meth)acryl-based monomer polymerization unit containing a hydroxyl group, and (c) a polyfunctional (meth)acrylamide-based monomer polymerization unit.

Other features and aspects will be apparent from the following detailed description and the claims.

DESCRIPTION OF THE INVENTION

Hereinafter, the present invention will be described in more detail. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present description, "(meth)acryl" refers to acryl and/or methacryl.

The present invention is for solving the above problems, and an object of the present invention is to provide a separator having excellent thermal resistance which may impart safety at a high temperature by reducing a shrinkage rate at a high temperature of a device, and a method of producing the same.

The separator for a lithium secondary battery according to an exemplary embodiment of the present invention includes a porous substrate and a coating layer including a binder and inorganic particles formed on one surface or both surfaces of the porous substrate, wherein the binder includes: (a) a (meth)acrylamide-based monomer polymerization unit, (b) a (meth)acryl-based monomer polymerization unit containing a hydroxyl group, and (c) a polyfunctional (meth)acrylamide-based monomer polymerization unit.

When the binder is used, a separator for a lithium secondary battery achieving an effect of reducing a shrinkage rate at a high temperature of the separator produced as compared with the conventional water-based binder, improving a problem of inorganic particles in a coating layer being detached and separated, showing a decreased interfacial resistance characteristic, and showing an improved air permeability, may be provided. In addition, a lithium secondary battery produced using the separator including the binder may reduce electrical resistance to show improved performance in terms of capacity and output in the production into a lithium secondary battery.

Hereinafter, the above configuration will be described in detail. The separator for a lithium secondary battery according to an exemplary embodiment of the present invention includes the porous substrate.

In an exemplary embodiment of the present invention, the porous substrate is commonly used in the art and may be a woven fabric, a non-woven fabric, a porous film, or the like, but is not limited thereto.

The material of the porous substrate is not limited, but specifically, for example, polyolefins such as polyethylene and polypropylene, polyesters such as polyethylene terephthalate and polybutylene terephthalate, polyacetal, polyamide, polyimide, polycarbonate, polyether ether ketone, polyarylether ketone, polyetherimide, polyamideimide, polybenzimidazole, polyethersulfone, polyphenylene oxide, cyclic olefin copolymers, polyphenylene sulfide, polyethylene naphthalate, glass fiber, Teflon, polytetrafluoroethylene, and the like may be used, and the material may be formed of a resin of any one or two or more selected from the group consisting thereof.

More specifically, as the porous substrate, a polyolefin-based porous substrate which may be adjusted for finer pores is more preferred, but is not limited thereto.

The polyolefin-based porous substrate is usually produced in the form of a film and is not limited as long as it is usually used as a separator of a lithium secondary battery, and an example thereof includes polyethylene, polypropylene, copolymers thereof, and the like, but is not necessarily limited thereto.

The thickness of the porous substrate is not particularly limited, and for example, may be 1 to 100 µm, specifically 5 to 50 µm, and more specifically 5 to 30 µm, but is not limited thereto.

The separator for a lithium secondary battery according to an exemplary embodiment of the present invention includes a coating layer.

The coating layer is formed on one surface or both surfaces of the porous substrate, and may be coated on the entire surface of one side surface.

The thickness is not particularly limited, and the coating layer may be coated at a thickness of, for example, 0.01 to 10 μm, specifically 0.1 to 10 μm, and more specifically 0.3 to 5 μm, but the thickness is not limited thereto.

A weight per unit area of the coating layer may be 2 to 100 g/m², but is not necessarily limited thereto.

The coating layer may have contents of the inorganic particles and the binder at a weight ratio of inorganic particles:binder of 50:50 to 99.9:0.1, specifically 80:20 to 99.9:0.1, more specifically 90:10 to 99:1, and still more specifically 95:5 to 99:1.

In an exemplary embodiment of the present invention, the coating layer may be formed by applying a slurry composition including the inorganic particles and the binder.

More specifically, for example, the slurry composition may include the inorganic particles and the binder, and more specifically, may include the inorganic particles, the binder, and a solvent. In addition, the solid content may be 5 to 40 wt %, but the present invention is not limited thereto.

A specific binder is applied to the present disclosure as the binder, thereby reducing a shrinkage rate at a high temperature and forming a coating layer having excellent thermal resistance, and the coating layer may provide a separator for a lithium secondary battery having improved adhesive strength of the inorganic particles, showing a decreased interfacial resistance characteristic, and showing an improved air permeability. The lithium secondary battery produced using the separator including the binder may reduce electrical resistance to show improved performance in terms of capacity and output in the production into a lithium secondary battery.

The binder may include: (a) a (meth)acrylamide-based monomer polymerization unit, (b) a (meth)acryl-based monomer polymerization unit containing a hydroxyl group, and (c) a polyfunctional (meth)acrylamide-based monomer polymerization unit.

More specifically, in the separator for a lithium secondary battery according to an exemplary embodiment of the present invention, the binder may be a binder prepared by including (a) 65 to 96 mol % of the (meth)acrylamide-based monomer, (b) 3 to 34 mol % of the (meth)acryl-based monomer containing a hydroxyl group, and (c) 0.001 to 1 mol % of the polyfunctional (meth)acrylamide-based monomer.

(a) The (meth)acrylamide-based monomer polymerization unit of the binder may be represented by the following Chemical Formula 1:

[Chemical Formula 1]

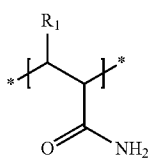

wherein $R_1$ is hydrogen or a C1 to C6 alkyl group.

(b) The (meth)acryl-based monomer polymerization unit containing a hydroxyl group of the binder may be represented by the following Chemical Formula 2:

[Chemical Formula 2]

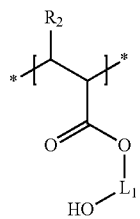

wherein $R_2$ is hydrogen or a C1 to C6 alkyl group. In addition, $L_1$ is a linear or branched C1 to C6 alkylene group.

(c) The polyfunctional (meth)acrylamide-based monomer polymerization unit may be produced by polymerizing a polyfunctional monomer represented by the following Chemical Formula 3:

[Chemical Formula 3]

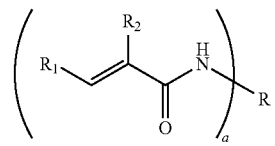

wherein $R_1$ and $R_2$ are independently of each other hydrogen or a C1 to C6 alkyl group, R is a linear or branched C1 to C10 hydrocarbon group, and a is an integer of 2 to 6.

As an example, the content of (a) the (meth)acrylamide-based monomer in the binder may be 65 to 96 mol %, specifically 66 to 95 mol %, specifically 67 to 94 mol %, specifically 68 to 93 mol %, and specifically 70.5 mol % to 91.5 mol %. The content of (b) the (meth)acryl-based monomer containing a hydroxyl group may be 3 to 34 mol %, specifically 4 to 33 mol %, specifically 5 to 32 mol %, specifically 6 to 31 mol %, and specifically 8 mol % to 29 mol %. The content of (c) the polyfunctional (meth)acrylamide-based monomer may be 0.001 to 1 mol %, specifically 0.005 to 0.9 mol %, and more specifically 0.01 to 0.5 mol %, thereby preparing the binder. When the binder is prepared in the above content range, the adhesive strength of the inorganic particles may be further improved, a more significant effect may be obtained in the shrinkage rate at a high temperature, air permeability is better, and a separator for a lithium secondary battery having lower resistance may be provided.

The binder having a weight average molecular weight of 100,000 or more, specifically 200,000 or more, and still more specifically 250,000 to 2,000,000. In a weight average molecular weight range satisfying the above, the adhesive strength may be further improved. The weight average molecular weight is an average molecular weight in terms of polyethylene glycol measured using gel permeation chromatography.

The binder may be prepared by various methods known in the art such as emulsion polymerization, suspension polymerization, mass polymerization, solution polymerization, or bulk polymerization. The viscosity of an aqueous solution including the binder at a solid content of 10 wt % may be 3000 cps or less, specifically 2500 cps or less, more specifically 2000 cps or less, and still more specifically 1500 cps or less, but is not limited thereto. When the binder is mixed in the above range with the inorganic particles to prepare a slurry, the viscosity of the slurry may be further lowered and coatability may be further improved.

In an exemplary embodiment of the present invention, a solution used in the slurry composition for forming the coating layer is usually prepared as an aqueous solution, and if necessary, a polar aprotic solvent or a polar protic solvent such as acetone, tetrahydrofuran, dimethylformamide, and N-methyl-2-pyrrolidone may be used.

In an exemplary embodiment of the present invention, the inorganic particles used in forming the coating layer are not particularly limited as long as they are electrochemically stable.

A non-limiting example of the inorganic particles includes boehmite, $CeO_2$, MgO, CaO, ZnO, $Al_2O_3$, $TiO_2$, $BaTiO_3$, $HfO_2$, $SrTiO_3$, $SnO_2$, NiO, $ZrO_2$, $Y_2O_3$, SiC, $BaTiO_3$, and the like, but is not necessarily limited thereto. In addition, these may be used alone or in combination of two or more.

In an exemplary embodiment of the present invention, the size of the inorganic particles is not limited, but for imparting smooth coating and excellent electrical properties, the average particle diameter may be in a range of 10 nm to 10 µm. The dispersibility and coatability of the slurry composition are further improved and the desorption of the inorganic particles may be further prevented in the above range, but the present invention is not necessarily limited thereto.

the slurry composition may be prepared usually by adding the inorganic particles to the binder solution and then sufficiently crushing the inorganic particles using a ball mill to pulverize aggregates.

A method of coating the binder solution in which the inorganic particles are dispersed on the porous substrate is not particularly limited, but the solution may be coated on one surface or both surfaces of the porous substrate by various methods such as roll coating, spin coating, dip coating, bar coating, die coating, slit coating, and ink-jet printing without limitation.

Another embodiment of the present invention provides a separator for a lithium secondary battery produced from the porous substrate including the coating layer as described above.

The separator for a lithium secondary battery may show a change amount of air permeability (ΔG) as represented in the following Equation 1:

$$\Delta G = G1 - G2 \leq 70 \quad \text{[Equation 1]}$$

wherein G1 is a Gurley permeability of a separator including the coating layer, G2 is a Gurley permeability of the porous substrate itself, and the Gurley permeability is measured in accordance with ASTM D726 and has a unit of sec/100 cc.

In Equation 1, ΔG may be 70 sec/100 cc or less, specifically, for example, 1 to 65 sec/100 cc, and more specifically 5 to 60 sec/100 cc. The change amount of air permeability is significantly small in the above range, and thus, the air permeability of the binder is better.

The binder according to an exemplary embodiment of the present invention has a significantly small change amount of air permeability (that is, ΔG is lowered) as compared with the conventional binder, and when the binder is produced into a battery, electrical resistance is further lowered, and thus, performance of the battery, that is, the capacity is relatively increased as compared with other binders and the shrinkage rate at a high temperature is also further reduced.

In addition, when the separator for a lithium secondary battery is allowed to stand in a hot air drying oven at 150° C. for 60 minutes, the separator for a lithium secondary battery measured may be 5% or less, specifically 4% or less, and more specifically 3% or less.

In addition, by adopting the separator according to an exemplary embodiment of the present invention, the lithium secondary battery produced may have a resistance ratio of 1.10 or less, specifically, for example, 1.07 or less, and more specifically 1.05 or less, relative to a separator having no coating layer formed. The resistance ratio may be expressed by the following Equation 2:

$$\text{Resistance ratio} = \text{Resistance 2}/\text{Resistance 1} \quad \text{[Equation 2]}$$

wherein the resistance ratio is measured by a ratio between Resistance 2 and Resistance 1, Resistance 1 being a resistance when a porous substrate having no coating layer formed is used as a separator and Resistance 2 being a resistance when a separator having a coating layer formed on one surface of a porous substrate is used. The lithium secondary battery of the present disclosure having the resistance ratio may reduce electrical resistance to show improved performance in terms of capacity and output in the production into a lithium secondary battery.

Another embodiment of the present invention includes a method of producing a separator for a lithium secondary battery including the coating layer and the porous substrate. The method of producing a separator for a lithium secondary battery is a method of producing a separator for a lithium secondary battery including (s1) preparing a slurry composition including a binder and inorganic particles; and (s2) applying the slurry composition on one surface or both surfaces of a porous substrate to form a coating layer, wherein the binder is a binder including: (a) a (meth)acrylamide-based monomer polymerization unit, (b) a (meth)acryl-based monomer polymerization unit containing a hydroxyl group, and (c) a polyfunctional (meth)acrylamide-based monomer polymerization unit.

The step (s1) is a step of preparing a slurry composition, and an aqueous solution of the binder described above, the inorganic particles, and water are stirred to prepare the slurry composition.

The step (s2) is a step of applying the slurry composition on one surface or both surfaces of the porous substrate to form a coating layer, in which the slurry composition is applied to one surface or both surfaces of the porous substrate by the coating method described above and then dried to produce a separator.

The separator produced by the above method according to an exemplary embodiment of the present invention may be applied to an electrochemical device, and an example of the electrochemical device may include a lithium secondary battery. Since the electrochemical device is well known and its configuration is also known, it will not be described in detail in the present invention.

The lithium secondary battery according to an exemplary embodiment of the present invention may include the separator described above between a positive electrode and a negative electrode. Here, the positive electrode and the negative electrode may be used without limitation as long as they are commonly used in the lithium secondary battery.

Hereinafter, the present invention will be described in more detail with reference to the Examples and Comparative Examples. However, the following Examples and Comparative Examples are only an example for describing the present invention in more detail, and do not limit the present invention in any way.

[Method of Measuring Physical Properties]
1. Weight Average Molecular Weight

Measurement was performed using GPC (EcoSEC® HLC-8320 GPC Refractive Index detector from Tosoh Corporation), TSKgel® guard PWx, two columns of TSKgel® GMPWx1 and TSKgel® G2500PWx1 (7.8×300 mm) were used as a GPC column, a 0.1 M aqueous NaNO$_3$ solution was used as a solvent, polyethylene glycol was used as a standard, and analysis was performed at 40° C. at a flow rate of 1 mL/min.

2. Viscosity

Viscosity was measured at 25° C. by setting rpm to a torque of 60-70% by a Brookfield viscometer (model RVDV2), spindle of CPA-52Z.

3. Adhesive Strength

A separator was cut into a size of 50 mm×50 mm and placed with a coating layer positioned on top, a sheet of black drawing paper (20 mm×150 mm×T 0.25 mm) was placed thereon, and a constant pressure (10 g/cm$^2$) was applied using a presser. The black drawing paper was forcefully pulled aside, a degree of inorganic substance adhered on the surface was confirmed, and a degree was determined as A/B/C/D/F as follows, depending on the adhered degree:

A: no adhesion

B: inorganic substance adhered in a small amount

In C-F, the binder and the inorganic substance are adhered together and the degree is severe toward F.

4. Shrinkage Rate at a High Temperature

A separator was cut into a square shape with a side of 10 cm, and a transverse direction (TD) and a machine direction (MD) were indicated. A sample was placed in the center, 5 sheets of paper were placed each on and under the sample, and the four sides of the paper were wrapped with a tape. The sample wrapped in paper was allowed to stand in a hot air drying oven at 150° C. for 60 minutes. Thereafter, the sample was taken out of the oven, the separator was measured with a camera, and a shrinkage in a machine direction (MD) of the following Mathematical Formula 1, and a shrinkage in a transverse direction (TD) of the following Mathematical Formula 2 were calculated:

Shrinkage rate at a high temperature in machine direction (%)=(length in machine direction before heating−length in machine direction after heating)×100/length in machine direction before heating [Mathematical Formula 1]

Shrinkage rate at a high temperature in transverse direction (%)=(length in transverse direction before heating−length in transverse direction after heating)×100/length in transverse direction before heating [Mathematical Formula 2]

5. Change Amount of Air Permeability (Gurley Permeability Increase Rate) (ΔG)

A change amount of air permeability was determined by the following Equation 1-1 by measuring a Gurley permeability. It was measured according to the standard of ASTM D726, using a densometer available from Toyoseiki. A time it took for 100 cc of air to pass a separator having an area of 1 in$^2$ was recorded in seconds and compared.

$$\Delta G = G1 - G2 \qquad \text{[Equation 1-1]}$$

wherein G1 is a Gurley permeability of a separator including the coating layer, and G2 is a Gurley permeability of the porous substrate itself.

6. Resistance Characteristics of Secondary Battery

Each battery produced by an assembly process according to the Examples and the Comparative Examples was charged at a constant current-constant voltage (CC-CV) of 4.2 V using a charge/discharge cycle instrument, and then discharged. Then, direct current internal resistance (DC-IR) was measured at 60% of state of charge (SOC) by a J-pulse method. Here, resistance when a porous substrate having no coating layer formed was used as a separator (Resistance 1) and resistance when a separator having a coating layer formed on one surface of the porous substrate is used (Resistance 2) were measured, respectively, and a resistance ratio between Resistance 2 and Resistance 1 was calculated. The resistance ratio may be expressed by the following Equation 2:

$$\text{Resistance ratio=Resistance 2/Resistance 1} \qquad \text{[Equation 2]}$$

7. Storage at a High Temperature

Each battery (2 Ah Cell) produced by an assembly process according to the Examples and the Comparative Examples was stored in an oven at 60° C. for 24 days, direct current internal resistance (DC-IR) was measured by the J-pulse method described above, and then a resistance increase rate was calculated. The resistance increase rate may be expressed by the following Equation 3:

$$\Delta R(\%) = (R_2 - R_1)/R_1 \times 100 \qquad \text{[Equation 3]}$$

wherein $R_1$ is a resistance before experiment of each battery produced, and $R_2$ is a resistance after storing the battery at 60° C. for 24 days. The resistance increase rate (change amount, ΔR) value according to Equation 3 was calculated and is shown in Table 2.

Example 1

[Preparation of Binder]

A 1.0 L flask was replaced with nitrogen, and 64.7 g of acrylamide, 10.4 g of 2-hydroxyethylacrylate, 0.008 g of N,N-methylenebisacrylamide, and 676 g of distilled water were added to the flask and then heated to 70° C. Thereafter, 0.200 g of potassium persulfate as a polymerization initiator was added to the flask, and a polymerization reaction was performed. After the reaction was performed for 15 hours, the flask was exposed to the air after 15 hours to stop the polymerization reaction, the temperature was lowered to room temperature, a 1 M sodium hydroxide solution was added to adjust pH to 7 to prepare a 10 wt % aqueous solution, and a viscosity was measured. The results are shown in Table 1.

[Preparation of Coating Solution]

97 wt % of boehmite particles (γ-AlO(OH), available from Nabaltec, APYRAL® AOH60) having an average particle diameter of 700 nm as non-conductive particles and 3 wt % of the binder prepared above (based on solid content) were added to water as a solvent and stirring was performed to prepare a slurry composition for a coating layer having a solid concentration of 30 wt %.

[Preparation of Separator]

A separator substrate (ENPASS™, SK ie technology Co., Ltd.) having a width of 150 mm, a length of 100 mm, and a thickness of 9 μm was used. The coating solution prepared above was bar-coated on one surface of the substrate at a speed of 3 m/min to form an active inorganic coating layer. After application, the substrate was passed through a hot air drier at 40° C. to be dried and was wound in a roll shape. After winding, the thickness of the coated separator was measured as a total of 12 μm and the thickness of the coating layer was 3 μm. The separator produced was used to evaluate adhesive strength, a shrinkage rate at a high temperature, storage at a high temperature, an increase rate of Gurley permeability, and resistance characteristics.

[Production of Battery]

95 wt % of artificial graphite as a negative electrode active material, 3 wt % of acrylic latex having Tg of −52° C. (solid content of 20 wt %), and 2 wt % of carboxymethyl cellulose (CMC) as a thickener were added to water and stirring was performed to prepare a uniform negative electrode slurry. The slurry was coated on a copper foil having a thickness of 20 μm, dried, and pressed to produce a negative electrode plate having a thickness of 150 μm.

94 wt % of $LiCoO_2$ as a positive electrode active material, 2.5 wt % of polyvinylidene fluoride as a fusion agent, and 3.5 wt % of carbon black as a conductive agent were added to N-methyl-2-pyrrolidone (NMP) as a solvent and stirring was performed to produce an uniform positive electrode slurry. The slurry was coated on an aluminum foil having a thickness of 30 μm, dried, and pressed to produce a positive electrode plate having a thickness of 150 μm.

The separator was disposed between the positive electrode and the negative electrode to produce a battery in a pouch form. An electrolyte solution to which ethylene carbonate (Ec)/ethylmethyl carbonate (EMC)/dimethyl carbonate (DMC)=25:45:20 (volume ratio) in which 1 M lithium hexafluorophosphate ($LiPF_6$) was dissolved was added, was injected into the assembled battery. For sealing the opening the aluminum packaging, the opening of the aluminum exterior was closed by heat sealing at 165° C. to produce a pouch-type lithium secondary battery of 650 mAh. The resistance of the obtained lithium secondary battery was evaluated by the method described above, and is shown in Table 2.

Examples 2 to 7

Batteries were produced in the same manner as in Example 1, except that the binder was prepared with the composition of the following Table 1. The physical properties are shown in the following Table 2.

Examples 8 and 9

Batteries were produced in the same manner as in Example 1, except that the binder was prepared using 2-hydroxyethylmethacrylate instead of 2-hydroxyethylacrylate with the composition of the following Table 1. The physical properties are shown in the following Table 2.

Comparative Examples 1 to 11

Batteries were produced in the same manner as in Example 1, except that the binder was prepared with the composition of the following Table 1. The physical properties are shown in the following Table 2.

Comparative Example 12

A water-dispersed binder having a latex content of 20 wt % was used as a commercial acrylic water-dispersible binder. The viscosity of the binder was measured and is shown in the following Table 1.

In addition, a coating solution was prepared in the same manner as in Example 1, a separator was produced, and then a battery was produced. The physical properties are shown in the following Table 2.

TABLE 1

| | AM (g) | 2-HEA (g) or 2-HEMA (g) | PAA (g) | Water (g) | Viscosity of 10 wt % aqueous solution (cps) | Weight average molecular weight (g/mol) |
|---|---|---|---|---|---|---|
| Example 1 | 64.7 | 10.4 | 0.008 | 676 | 990 | 280,000 |
| Example 2 | 64.7 | 10.4 | 0.03 | 676 | 1005 | 280,000 |
| Example 3 | 64.7 | 10.4 | 0.06 | 676 | 1050 | 280,000 |
| Example 4 | 57.6 | 20.9 | 0.008 | 706 | 1110 | 300,000 |
| Example 5 | 57.6 | 20.9 | 0.031 | 706 | 1025 | 300,000 |
| Example 6 | 57.6 | 20.9 | 0.063 | 706 | 1075 | 300,000 |
| Example 7 | 50.5 | 33.7 | 0.008 | 757 | 1175 | 290,000 |
| Example 8 | 59 | 19.7 | 0.008 | 730 | 1106 | 280,000 |
| Example 9 | 59 | 19.7 | 0.065 | 730 | 942 | 280,000 |
| Comparative Example 1 | 70 | 0 | 0 | 630 | 1224 | 280,000 |
| Comparative Example 2 | 70 | 0 | 0.0007 | 630 | 1199 | 290,000 |
| Comparative Example 3 | 70 | 0 | 0.0035 | 630 | 1138 | 290,000 |
| Comparative Example 4 | 70 | 0 | 0.007 | 630 | 1016 | 290,000 |
| Comparative Example 5 | 70 | 0 | 0.028 | 630 | 1174 | 290,000 |
| Comparative Example 6 | 70 | 0 | 0.056 | 630 | 1180 | 300,000 |
| Comparative Example 7 | 70 | 0 | 0.084 | 630 | 1560 | 280,000 |
| Comparative Example 8 | 70 | 0 | 0.21 | 630 | 1214 | 300,000 |
| Comparative Example 9 | 64.7 | 10.4 | 0 | 676 | 1105 | 280,000 |
| Comparative Example 10 | 57.6 | 20.9 | 0 | 706 | 1075 | 290,000 |
| Comparative Example 11 | 50.5 | 33.7 | 0 | 757 | 1150 | 280,000 |
| Comparative Example 12 | — | — | — | — | 674 | — |

In Table 1, AM is acrylamide, 2-HEA is 2-hydroxyethylacrylate, 2-HEMA is 2-hydroxyethylmethacrylate, and PAA (polyfunctional acrylamide) is N-methylenebisacrylamide.

TABLE 2

| | Composition (mol %) | | | ΔG (delta Gurley) | Shrinkage rate at a high temperature (%) | | Adhesive strength | Battery resistance | |
|---|---|---|---|---|---|---|---|---|---|
| | AM | 2-HEA or 2-HEMA | PAA | | MD | TD | | Resistance ratio | Resistance increase rate (%) * |
| Example 1 | 91.037 | 8.958 | 0.005 | 70 | 2.6 | 3.0 | A | 1.065 | 18.8 |
| Example 2 | 91.024 | 8.956 | 0.02 | 68 | 1.7 | 1.4 | A | 1.058 | 15.3 |
| Example 3 | 91.007 | 8.954 | 0.039 | 62 | 1.9 | 2.0 | A | 1.059 | 13.5 |
| Example 4 | 81.822 | 18.173 | 0.005 | 59 | 2.1 | 2.1 | A | 1.047 | 16.1 |

TABLE 2-continued

| | Composition (mol %) | | | ΔG (delta Gurley) | Shrinkage rate at a high temperature (%) | | Adhesive strength | Battery resistance | |
| --- | --- | --- | --- | --- | --- | --- | --- | --- | --- |
| | AM | 2-HEA or 2-HEMA | PAA | | MD | TD | | Resistance ratio | Resistance increase rate (%) * |
| Example 5 | 81.809 | 18.17 | 0.021 | 62 | 2.1 | 1.8 | A | 1.050 | 17.3 |
| Example 6 | 81.792 | 18.167 | 0.041 | 57 | 1.7 | 2.0 | A | 1.051 | 18.1 |
| Example 7 | 70.995 | 29 | 0.005 | 36 | 3.0 | 3.0 | A | 1.010 | 14.8 |
| Example 8 | 83.026 | 16.969 | 0.005 | 64 | 0.6 | 0.8 | A | 1.006 | 13.5 |
| Example 9 | 82.996 | 16.963 | 0.041 | 60 | 2.0 | 1.9 | A | 1.047 | 14.1 |
| Comparative Example 1 | 100 | 0 | 0 | 83 | 4.8 | 4.8 | B | 1.150 | 24.8 |
| Comparative Example 2 | 99.9996 | 0 | 0.0004 | 77 | 4.2 | 5.2 | A | 1.116 | 25.4 |
| Comparative Example 3 | 99.9977 | 0 | 0.0023 | 80 | 6.6 | 5.6 | A | 1.116 | 26.1 |
| Comparative Example 4 | 99.995 | 0 | 0.005 | 85 | 3.3 | 3.5 | A | 1.126 | 26.5 |
| Comparative Example 5 | 99.982 | 0 | 0.018 | 84 | 5.6 | 3.3 | A | 1.126 | 25.3 |
| Comparative Example 6 | 99.963 | 0 | 0.037 | 78 | 1.8 | 1.7 | A | 1.108 | 26.1 |
| Comparative Example 7 | 99.945 | 0 | 0.055 | 76 | 2.7 | 3.6 | A | 1.103 | 24.3 |
| Comparative Example 8 | 99.862 | 0 | 0.138 | 75 | 5.2 | 3.4 | A | 1.108 | 23.1 |
| Comparative Example 9 | 91.043 | 8.957 | 0 | 73 | 1.5 | 1.3 | B | 1.076 | 20.9 |
| Comparative Example 10 | 81.826 | 18.174 | 0 | 62 | 1.3 | 1.3 | B | 1.059 | 15.5 |
| Comparative Example 11 | 70.998 | 29.002 | 0 | 46 | 2.8 | 2.3 | B | 1.067 | 18.7 |
| Comparative Example 12 | Acrylic water-dispersion type | | | 61 | 63.8 | 47.2 | A | 1.076 | 21.1 |

* Resistance increase rate (storage at a high temperature): 2 Ah Cell, 60° C., stored for 24 hours.

As seen from Table 2, it was confirmed that Examples 1 to 9 had excellent adhesive strength and a significantly low shrinkage rate at a high temperature of 5% or less, specifically 3% or less, at the same weight as compared with Comparative Examples 1 to 12. In addition, a Gurley permeability increase rate showing a change amount of air permeability (ΔG) was significant low, and thus, it was confirmed that the air permeability of the binder was excellent.

In addition, it was confirmed that the resistance increase rate was significantly low when the present invention was applied. Therefore, the battery including the separator for a lithium secondary battery produced according to an exemplary embodiment of the present invention had a resistance ratio of less than 1.1 as compared with the battery including no separator of the present invention, and this is considered as being an effect obtained by lithium ions easily passing through the separator, since the binder of the present invention has a low shrinkage rate and an excellent air permeability.

In addition, the separator for a lithium secondary battery of an exemplary embodiment of the present invention showed excellent stability at a high temperature and an excellent effect in adhesive strength, and thus, it was confirmed that the adhesive strength was improved.

That is, the separator for a lithium secondary battery of an exemplary embodiment of the present invention had a significantly low shrinkage rate at a high temperature both in MD and TD of 5% or less, specifically 3% or less.

The separator for a lithium secondary battery according to the present invention has improved adhesive strength of inorganic particles, so that the inorganic particles are not easily desorbed.

In addition, the separator for a lithium secondary battery according to an exemplary embodiment has a significantly reduced shrinkage rate at a high temperature, and thus, a separator for a lithium secondary battery having excellent thermal resistance may be provided.

In addition, the separator for a lithium secondary battery according to the present invention has an excellent air permeability and has greatly decreased resistance in the production of a battery. Therefore, a lithium secondary battery using the separator for a lithium secondary battery according to the present invention has an improved capacity and significantly improved output and life characteristics.

Hereinabove, although the present invention has been described by specific matters, limited exemplary embodiments, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

What is claimed is:

1. A separator for a lithium secondary battery comprising:
a porous substrate; and
a coating layer comprising a binder and inorganic particles formed on one surface or both surfaces of the porous substrate, wherein the binder is a binder comprising: (a) 68 to 93 mol % of a (meth)acrylamide-based monomer polymerization unit, (b) 6 to 31 mol % of a (meth)acryl-based monomer polymerization unit containing a hydroxyl group, and (c) 0.005 to 0.041 mol % of a polyfunctional (meth)acrylamide-based monomer polymerization unit, wherein (b) the (meth)acryl-based monomer polymerization unit containing a hydroxyl group is represented by the following Chemical Formula 2:

[Chemical Formula 2]

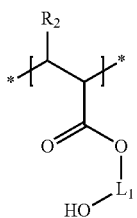

wherein $R_2$ is hydrogen or a C1 to C6 alkyl group, and $L_1$ is a linear or branched C1 to C6 alkylene group.

2. The separator for a lithium secondary battery of claim 1, wherein (c) the polyfunctional (meth)acrylamide-based monomer polymerization unit is produced by polymerizing a polyfunctional monomer represented by the following Chemical Formula 3:

[Chemical Formula 3]

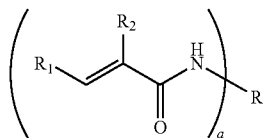

wherein $R_1$ and $R_2$ are independently of each other hydrogen or a C1 to C6 alkyl group, R is a linear or branched C1 to C10 hydrocarbon group, and a is an integer of 2 to 6.

3. The separator for a lithium secondary battery of claim 1, wherein the binder has a weight average molecular weight of 100,000 to 2,000,000 g/mol.

4. The separator for a lithium secondary battery of claim 1, wherein the coating layer comprises 50 to 99.9 wt % of the inorganic particles and 0.1 to 50 wt % of the binder based on a total weight of the coating layer.

5. The separator for a lithium secondary battery of claim 1, wherein the separator for a lithium secondary battery has a shrinkage rate both in a machine direction (MD) and a transverse direction (TD) of 5% or less after being allowed to stand at 150° C. for 60 minutes.

6. The separator for a lithium secondary battery of claim 5, wherein the separator for a lithium secondary battery has a shrinkage rate both in the machine direction (MD) and the transverse direction (TD) of 3% or less after being allowed to stand at 150° for 60 minutes.

7. The separator for a lithium secondary battery of claim 1, wherein the separator for a lithium secondary battery has a change amount of air permeability ($\Delta G$) satisfying the following Equation 1:

$$\Delta G = G1 - G2 \leq 70 \quad \text{[Equation 1]}$$

wherein

G1 is a Gurley permeability of the separator comprising the coating layer,

G2 is a Gurley permeability of the porous substrate itself, and the Gurley permeability is measured in accordance with ASTM D726 and has a unit of sec/100 cc.

8. The separator for a lithium secondary battery of claim 1, wherein the coating layer has a thickness of 0.3 to 10 μm.

9. A lithium secondary battery comprising the separator for a lithium secondary battery of claim 1.

10. A method of producing a separator for a lithium secondary battery, the method comprising:

(s1) preparing a slurry composition comprising a binder and inorganic particles; and (s2) applying the slurry composition on one surface or both surfaces of a porous substrate to form a coating layer, wherein the binder is a binder comprising: (a) 66 to 93 mol % of a (meth)acrylamide-based monomer polymerization unit, (b) 6 to 31 mol % of a (meth)acryl-based monomer polymerization unit containing a hydroxyl group, and (c) 0.005 to 0.041 mol % of a polyfunctional (meth)acrylamide-based monomer polymerization unit, wherein (b) the (meth)acryl-based monomer polymerization unit containing a hydroxyl group is represented by the following Chemical Formula 2:

[Chemical Formula 2]

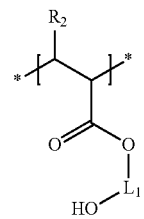

wherein $R_2$ is hydrogen or a C1 to C6 alkyl group, and $L_1$ is a linear or branched C1 to C6 alkylene group.

* * * * *